United States Patent [19]

Sublette et al.

[11] Patent Number: 4,469,582

[45] Date of Patent: Sep. 4, 1984

[54] ELECTRICALLY ENHANCED INCLINED PLATE SEPARATOR

[75] Inventors: Kerry L. Sublette, Tulsa; Floyd L. Prestridge, Mounds, both of Okla.

[73] Assignee: Combustion Engineering, Inc., Windsor, Conn.

[21] Appl. No.: 360,253

[22] Filed: Mar. 22, 1982

[51] Int. Cl.³ .................. B01D 13/02; B01D 17/06; B03C 5/02; C10G 33/02
[52] U.S. Cl. .................................. 204/302; 204/308
[58] Field of Search .............. 204/302, 304, 305, 306, 204/307, 308

[56] References Cited

U.S. PATENT DOCUMENTS

| | | | |
|---|---|---|---|
| 2,478,934 | 8/1949 | Morse | 204/299 |
| 3,476,678 | 11/1969 | Murdock | 204/308 |
| 4,181,591 | 1/1980 | King | 204/275 |

OTHER PUBLICATIONS

Morrison J. *Oil and Gas Journal*, pp. 86-88, (Dec. 14, 1970)

Primary Examiner—Howard S. Williams
Assistant Examiner—T. Williams
Attorney, Agent, or Firm—Arthur L. Wade

[57] ABSTRACT

The shell of a cylindrical vessel, horizontally extended, contains three compartments through which emulsions of polar and non-polar liquids are sequentially passed for separation. The heating and the electric field in the first two compartments are optional. The third compartment contains an inclined plate separator connected to an electrical system to generate electric fields within the passages of the separator to coalesce and separate the polar liquid from the non-polar liquid.

12 Claims, 3 Drawing Figures

ELECTRICALLY ENHANCED INCLINED PLATE SEPARATOR

TECHNICAL FIELD

The present invention relates to the close coupling of an electric field and an inclined plate separator in progressively coalescing relatively polar liquids which have been dispersed in a relatively non-polar continuous phase. More particularly, the present invention relates to structurally combining the electrodes of an electric field with the parallel and inclined plates of a separator to provide a degrading electric field between the plates to enhance coalescence and collecting of droplets of relatively polar liquid.

BACKGROUND ART

The Oil Well Stream

There is an omnipresent need in the oil industry for rapid, high-volume liquid/liquid separation in which one of the liquid phases is conventional crude oil, or "syncrude" produced from tar sands, or shale oil, and the other is water, or brine. Oil and water are, of course, immiscible, however, an aqueous phase is frequently present in produced oil as a highly dispersed, discontinuous phase. The mixture is referred to as an emulsion. The source of this aqueous phase is formation water and/or condensed steam used in secondary and tertiary recovery.

Coalescence With An Electric Field

The removal of entrained or emulsified water from oil is a long-standing problem, as evidenced by the following patents and publications: Prestridge, U.S. Pat. Nos. 3,772,180, 1973; 3,847,775, 1974; 4,116,790, 1978; 4,308,127, 1981; Waterman, L. C., *Chem. Eng. Progress,* 61 (10), 51–57 (1965); Sjoblom, G. L. and Goren, S. L., *I&EC Fund.,* 5 (4), 519–525 (1966). One of the more widely used methods of performing this separation involves the use of high voltage electric fields. Two mechanisms apparently operate to bring about coalescence of droplets of relatively polar water, or brine, in a non-polar medium, such as oil, with the force of an electric field. First, the water droplets may acquire a net charge by direct contact with a charging electrode, or through convective transfer of charge from the electrode by the oil. An attractive force will exist between water droplets which have acquired opposite charges. These attractive forces promote coalescence. Second, water droplets in an electric field will become polarized through alignment of the polar water molecules with the external field and through the redistribution of mobile charged particles or ions within the water droplet. Attractive electrostatic forces between oppositely charged regions of neighboring water droplets promote their coalescence. The realtive importance of these two mechanisms is evidently determined by the physical and chemical properties of the two phases. Of particular importance is the electrical conductivity of the oil. The mechanism of electrically enhanced coalescence has been discussed extensively in scientific literature. Refer to Pearce, C. A. R., *Brit. J. of Appl. Phys.,* 5, 136–143 (1954); Allan, R. S. and Mason, S. G., *Trans. Far. Soc.,* 57, 2027–2040 (1961); Pohl, H. A., *J. Appl. Phys.,* 22 (7), 869–871 (1951); Bailes, P. J. and Larkai, S. K. L., *Trans. I. Chem. E.,* 59, 229–237 (1981); Sadek, S. E. and Hendricks, C. D., *I&EC Fund.,* 13, 139–142 (1974).

The background art in electrically enhanced coalescence is replete with the many variations for effective application of electric fields to the resolution of mixtures of polar liquids dispersed in non-polar liquids. One variation which is especially pertinent to the present invention is that of the degrading electric field. This concept forms the basis of U.S. Pat. No. 4,126,537 (1978), F. L. Prestridge and U.S. Pat. No. 4,308,127 (1981), Prestridge and Longwell. In these disclosures of electrically enhanced coalescence, the voltage gradient between fixed electrodes is decreased in the direction of fluid flow by gradually widening the distance between the electrodes. The configuration of the electrode system is such that the emulsion to be treated is first exposed to a high electric field strength created by closely spaced electrodes, then exposed to progressively lower electric field strengths as the distance between the electrodes is increased. The importance of the degrading field concept, as represented by the foregoing disclosures lies in the fact that the use of degrading electric fields is a significant step forward in circumventing the inherent limitations of prior art electric treating systems. This will become apparent from the discussion which follows.

At a given electric field strength, the magnitude of attractive forces between neighboring polarized or charged droplets of polar liquid in a non-polar, relatively nonconductive continuous liquid phase are dependent, in part, upon droplet radius. The smaller the droplet radii, the weaker will be the attractive forces which promote coalescence. Droplet radii further influence coalescence efficiency by affecting collision frequency. Droplets of polar liquid which carry a net charge will move in an electric field toward an oppositely charged electrode. At a given field strength and droplet charge, droplet velocity decreases with droplet radii. Reduced droplet velocity and small droplet radii combine to give low collision frequencies. Since the attractive force between oppositely charged droplets increases with decreasing distance between them, a decrease in collision or encounter frequency has a negative influence of coalescence efficiency. Refer to: Sadek, S. E. and Hendricks, C. D., *I & EC Fund.,* 13, 139–142 (1974).

The attractive forces between polarized or charged droplets of polar liquid in a non-polar continuous phase, as well as the velocity of charged droplets, increase with increasing electric field strength to which the droplets are exposed. Therefore, it is not surprising that prior art has shown that very high field strengths are required to affect the coalescence of very small droplets of dispersed polar phase. However, at any given field strength there are certain limitations with respect to the maximum droplet size which may be achieved. Consider for the sake of discussion, an emulsion of water in oil. The first of these limitations concerns the hydrodynamic forces to which water droplets are exposed in an electric field. The net charge acquired by water droplets results in motion of these droplets in the area between two charged electrodes, or between a charged electrode and ground. Superimposed on this motion are electroconvective currents generated in the continuous oil phase. These movements subject the water droplets to hydrodynamic forces which may cause individual droplets to disperse. The magnitude of hydrodynamic force required to disperse a water droplet is dependent, in part, upon droplet radius. The smaller the droplet radius, the greater the hydrodynamic force required to disperse the droplet.

The second of these limitations concerns electrical stresses on water droplets. Charged droplets have a tendency to disperse when a critical gradient is produced at the droplet surface. The magnitude of the critical dispersing gradient is inversely proportional to the square root of the droplet radius. Therefore, the larger the charged droplet the lower the electrical gradient at the droplet surface which will cause droplet dispersal. Excessive charge gradients at the droplet surface may be established through conductive or convective charging of the droplet, or through polarization of the droplet. Both hydrodynamic and electrical stresses then tend to establish a maximum water droplet size in the electric field. This maximum size will be determined by the physical properties of the two liquid phases and the strength and homogeneity of the electric field. The limitations of electrical coalescing systems have been discussed in scientific literature. Refer to: Sadek, S. E. and Hendricks, C. D., *I&EC Fund.*, 13, 139–142 (1974); Waterman, L. C., *Chem. Eng. Prog.*, 61 (10), 51–57 (1965); Doyle, A., Moffett, D. R., Vonnegut, B., *J. Colloid Sci.*, 19, 136–143 (1964).

An emulsion of water or brine in crude oil will normally contain a distribution of aqueous phase droplet sizes. In oil field emulsions,for example, distributions in water droplet diameters of from 2–100 microns, or more, are not uncommon. In some emulsions the volume fraction of entrained water contained in the smallest droplets in the distribution can be significant enough to require their removal in order to produce a sufficiently dry oil. Coalescence of these very small water droplets requires high electric field strengths. However, as discussed previously, these high electric field strengths will limit the maximum droplet size achievable in the field. If water droplets of this limited size are of an insufficient size as to allow their gravitation from the oil, then little has been gained by their coalescence. In addition, any droplets of the original dispersion with dimensions greater than the maximum droplet size for the treating field strength will be dispersed. Prior to the appearance of the degraded field concept, most electric treaters used electric fields which allowed the production of water droplets which were sufficiently large to allow their gravitation from the oil, but were of insufficient strength to allow appreciable coalescence of the smallest droplets of the emulsion. In a degraded field created by widening the distance between charged electrodes in the direction of flow, the emulsion is first exposed to a high gradient zone which allows coalescence of the very small droplets. The product of this zone is then passed into a second zone which possesses a lower electrical gradient. The electric field in this second zone is of sufficient strength to promote coalescence of water droplets received from the first zone. However, the electric field in the second zone being weaker than that of the first zone allows an increase in the maximum droplet size which may exist in the field. Therefore, as the emulsion is passed progressively through electric fields of decreasing strength, the dispersed droplets grow in size until they are large enough to gravitate from the oil. The improvements over prior art offered by this type of degrading field are then, (1) more efficient coalescence of the very small droplets of typical water-in-oil emulsions, and (2) the creation of larger, more effectively gravitating water droplets in the treated mixture.

The embodiment of the degraded field concept described above offered significant improvement over prior art in electric treatment of organic continuous emulsions. However, it is not a panacea. Although the electric field strength decreases in the direction of flow, the charge on the electrodes remains relatively constant over its entire area. Therefore, mechanisms exist in low field strength areas for significant charging of water droplets by conductive or convective charge transfer and the subsequent dispersal of the droplet. Under the influence of electrical stresses, the droplet dispersal mechanism is such that the daughter droplets produced are much smaller than the original droplet. When these daughter droplets are produced in a low field strength area, there is little opportunity for their recoalescence. This problem is further compounded by the fact that critical dispersal gradients may be created in droplets near the electrodes in the exit region of the electric field through polarization of droplets. Strong polarization of the droplets can result from exposure to the locally strong inhomogeneous divergent electric fields at the electrode edges.

Inclined Plate Separators

The term "inclined plate, or surface, separator" is herein defined as any device which functions to separate a dispersed liquid phase from a second immiscible, continuous liquid phase on the basis of a difference in density which incorporates the following features: (1) the total flow is divided into multiple channels wherein a droplet of the dispersed liquid phase has only a relatively short distance to rise or fall before being collected at a surface; (2) the collection surfaces are inclined so that collected droplets of the dispersed liquid phase will move along the surface, encounter other droplets of dispersed phase, and coalesce to form larger droplets prior to leaving the surface.

The "inclined surface separator" is perhaps best typified by the separator developed many years ago by Royal Dutch Shell. The most common application of this separator has been in the removal of oil and sludge from refinery wastewater streams. The separator generally consists of an array of parallel flat, or corrugated, plates. The material for these plates may be metal, plastic, or fiberglass. Assembled, the array of plates is mounted in the flow stream at an angle with respect to the horizontal, to become collection surfaces for the dispersed liquid of the stream. In typical operation, the droplets of oil rise the relatively short distance between the plates, contact the bottom surface of a plate, move upward along the plate, and coalesce with other collected oil droplets. As a result, the coalesced oil droplets leaving the surfaces of the plate array are larger than those which enter the plate array. The larger drops rise at a greater velocity and are more effectively removed from the aqueous phase than the smaller droplets of the plate array influent. The increase in size of oil droplets affected by this form of separator significantly reduces the retention time required for adequate phase disengagement. Retention time is generally further reduced by the favorable, even-flow distribution created by hydraulic friction along the plates. Turbulence and large scale short circuiting are reduced. Decreased retention time translates into reduced vessel size and savings on capital expenditures. This form of separator can be reviewed in the following literature: Brunsmann, J. J., Cornelissen, J. and Eilers, H., *J. WPCF,* 51 (1), 44–55 (1962); Miranda, J. G., *Chem. Eng.,* 84 (3)

105-107 (1977); and Morrison, J., *Oil & Gas J.*, p. 86-88, (Dec. 14, 1970).

Though the inclined surface separator has found past application in the removal of oil from wastewater streams, the separator is equally well suited for the removal of water, or brine, droplets from oil. In this application, the dispersed droplets of aqueous phase simply fall, under the influence of gravity, the short distance between the plates where they collect and coalesce with other water droplets as they move down the inclined surface.

Inclined surface separators are subject to certain limitations with respect to the size of the dispersed phase droplet which may be collected. It is well-known that the settling velocity of droplets of a dispersed phase, whether it be oil, or water, in a second, immiscible continuous phase, increases with the square of the droplet diameter. For a given two-phase system, there is always a dispersed phase droplet size below which any device which depends solely on gravitation to affect separation, will be impractical. For example, in the removal of oil dispersed in water, it is generally accepted that it is economically and technologically impractical to attempt removal of oil droplets smaller than 80 microns with this type of separator. Refer to Boyd, J. L., Shell, G. L. and Dahlstrom, D. A., *A.I.Ch.E. Symposium Series*, No. 124, 68, 393-401 (1971).

Conclusion

Both electric coalescence and the coalescence effected by an inclined surface separator are subject to limitations in the resolution of dispersions of water, or brine, in oil. Electric coalescence devices are capable of coalescing extremely small water droplets, but there is an upper limit to the droplet size achievable determined by the physical properties of the two phases and the characteristics of the electric field, or fields, employed. If water droplet diameters could be increased beyond this upper limit, retention times required to effect adequate phase disengagement would be reduced. The inclined surface separator is not a feasible device for the coalescence of very small water droplets, but is ideally suited for further coalescence of water droplets produced by electrical coalescence. If, in the inclined plate separator configuration, there can be added provision for a degrading electric field with the initial sections of the inclined plates of the separator, the progressive advantages of the degrading electric field and inclined plate separator can be closely coupled to enhance coalescence in excess of the coalescence previously possible.

DISCLOSURE OF THE INVENTION

The present invention contemplates passing an emulsion of a relatively polar liquid phase dispersed in a relatively non-polar continuous liquid phase through a system of parallel plates which are mounted in the flow stream at an angle with respect to the horizontal. It is further contemplated that the first section of each plate, i.e. that part of each plate first presented to the emulsion, shall be composed of an electrically conductive material and the remaining section of the plate shall be composed of a nonconductive, or insulating, material which is in intimate physical contact with the conducting material. It is further contemplated that the conducting sections of each composite plate shall be energized electrically in such a way that the conducting material of adjacent plates in the array are charged with opposite polarity, or alternating plates are charged while the remaining plates are grounded. Therefore, the mixture of polar and non-polar liquids is progressively exposed to the coalescing force of the electric field which is decreased in strength in the direction of flow by virtue of decreasing charge density on the second section of the plates, and the coalesced liquid droplets are immediately brought into contact with the inclined plate surface to complete their coalescence.

Other objects, advantages and features of this invention will become apparent to one skilled in the art upon consideration of the written specification, appended claims, and attached drawings.

BRIEF DESIGNATION OF THE DRAWINGS

BEST MODE FOR CARRYING OUT THE INVENTION

Terms and Technology

Figure 1:
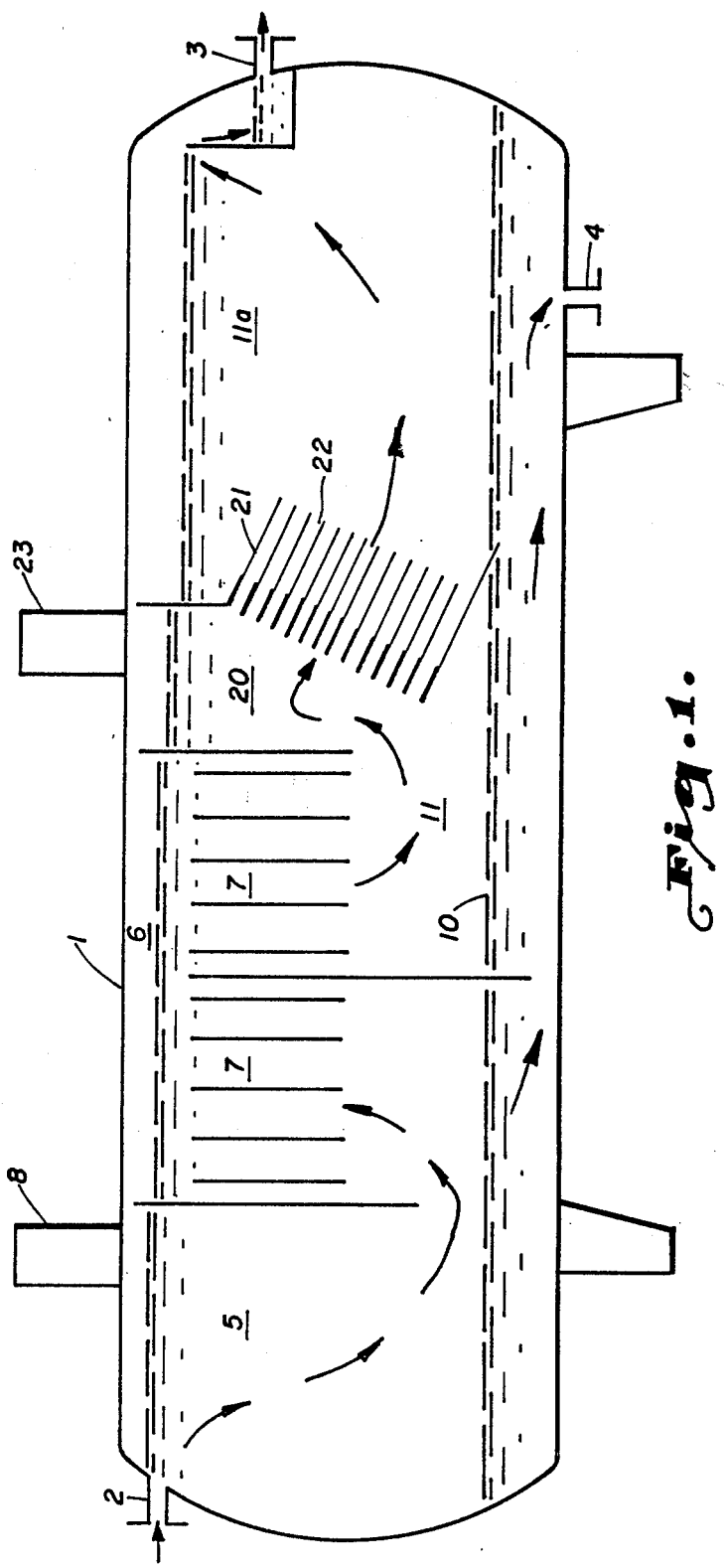
FIG. 1 is a sectioned elevation of a horizontally extended vessel having an inclined plate separator embodying the present invention.

The best mode embodying the invention speaks, specifically, to the structure in which oil well fluids of a mixture are separated. More particularly, the liquids separated are oil and water. It is recognized that the water originates in the formation from which oil is extracted and is, at times, referred to as brine. All this terminology related to water is, at times, swept into the phrase "aqueous phase".

In processing the liquid/liquid mixture within an electric field, it is necessary to distinguish the oil and water from each other on the basis of their electrical characteristics. Therefore, the terminology, at times, slips into the convention of referring to the water as conductive and the more polar of the liquids, and the oil as nonconductive and the non-polar of the liquids. This terminology is well developed in the art and should cause no confusion.

The field developed by charging electrodes has been rather consistently referred to as an "electric" field. It is common to also refer to the field as "electrostatic". Should the terminology become mixed in the use of these terms, there is little concern that those skilled in the art will be confused.

Turning to the inclined plate separator, it is advisable to point out that the parallel plates of this unit are referred to as grouped into an "array". It will be readily observed from the drawing that a number of these parallel plates can be referred to as "nesting" together to form parallel passages between the plates through which the processed mixture of liquids pass.

General Organization Within Shell 1

FIG. 1 discloses a sectioned elevation of a horizontally extended shell 1 in the simplest terms. An emulsion of oil and water, as a mixture of polar and non-polar liquids, is introduced into the lefthand end of the shell through conduit 2. Separated by the invention, the oil is removed from shell 1 through upper outlet 3, and water is removed from the shell 1 through lower outlet 4.

There may be gas in the emulsion introduced into the shell 1. For the purposes of disclosing the present invention, the gas will be ignored, the invention being directed to the liquid/liquid separation of oil and water.

Internally, the shell 1 is divided into compartments. The first compartment 5 indicates that a heat source within this compartment is arranged to be contacted by the well stream flowing through compartment 5. The purpose of this arrangement is to elevate the temperature of the well stream as may be required to enhance the liquid/liquid separation carried out by the downstream embodiment of the invention. Of course, this heat input to the well stream could be supplied by a heater in conduit 2 established upstream of shell 1. On the other hand, it may not be necessary to introduce any heat into the well stream in thermal preparation for its processing within shell 1.

There is significance to the horizontal orientation of shell 1. Each compartment within shell 1 receives the horizontally flowing liquids. The flow of the processed liquids, within each compartment, may be directed vertically, but the flow between compartments is significant in its horizontal orientation. After the liquid mixture has received the separation force provided within each compartment, some form of substantially horizontal flow space is provided in which a degree of disengagement between the immiscible liquids is expected. Controlled in their horizontal flow, these disengaged liquids have the maximum opportunity to gravitate upward or downward, in separation, without their flows opposing each other.

Electric Section

Compartment 6 is downstream of heater compartment 5 and receives the well stream within the temperature range suitable for initiation of the liquid/liquid separation in the electric field of compartment 6. The electric field in compartment 6 is disclosed as generated between electrodes 7, the electrodes being charged from a transformer 8. The arrangement of electrodes 7, the baffles required to properly direct the well stream through the electric field, and all other mechanical and circuit arrangements need not be contemplated in all of their available variations. The art is replete with the many variations for effective application of electric fields to the resolution of mixtures of relatively polar liquids dispersed in relatively non-polar liquids. This phenomenon has been exhaustively analyzed in the previous Background Art section of this application, including the references incorporated therein.

The end result of passing the well stream through compartment 6, and its electric field, is that the water, or aqueous phase, is formed into drops of increased size. Some are large enough to initiate their gravitation into a body of water 10 in the lower part of the shell 1.

Finally, it is to be clearly understood that the electric field of this compartment 6 may not be required upstream of the embodiment of the present invention. The electric field established with the present invention may be adequate to effect coalescence without any preparation by the field within compartment 6. Thus, the field generated within compartment 6 has the same optional status as the heater of compartment 5. The forces generated within these compartments may, or may not, be utilized upstream of the invention. However, both the heat of compartment 5 and the electric field of compartment 6 may be valuable options in a treater as represented within shell 1.

Disengagement Zone

The mixture of liquids exposed to the electric field of compartment 6 flows essentially horizontally through zone 11. Admittedly, zone 11 is no more than the volume within shell 1 below and downstream of compartment 6. However, this quiescent zone enables a significant amount of coalesced liquids to disengage and gravitate upward, or downward, as a part of the separation goal. By flowing these liquids through compartment 11 horizontally, disengagement of the oil from the water, and the water from the oil, is provided with a minimum of opposing flow which would delay their separation.

Of course, not all of the liquids disengage from each other, but remain as the mixture carried from zone 11 into the downstream compartment 20 in which is mounted the embodiment of the present invention.

Electrically Charged Inclined Plate Separator

In compartment 20 of shell 1, an essential element of the invention is embodied in an inclined plate separator structure 21 having a design for its plates 22 adapted to accept an electric charge from a source 23 which will generate a degrading electric field in the direction of fluid flow through the separator. The inclined plates 22 form the array 21 providing parallel passages for the oil/water mixture between the plates. The mixture is first exposed to the full strength of the electric field generated from the source 23, secondly, to the field strength as it degrades, and thirdly, to the surface of the plates upon which the coalescing fluids in the mixture collect and continue their coalescence begun in the electric field.

Second Disengagement Zone

Again, downstream of the array 21, a volumetric section 11a of the shell 1 is provided for disengagement of the additionally coalesced liquids of the mixture. Within this volume, the liquids discharged from the array 21 are given further opportunity to disengage, the oil ascending and the water descending to join their respective collections at the top and bottom of shell 1. Again, it is emphasized that the disengaging liquids are released essentially horizontally from the array 21 to give as little interference as possible to the ascent of the oil and descent of the water. The remaining arrangements for withdrawal of the oil and water separately from shell 1 become more commentary to the overall process carried out by the disclosed structure.

Electric Field Zones of the Inclined Plate Separator

Figures 2, 3:
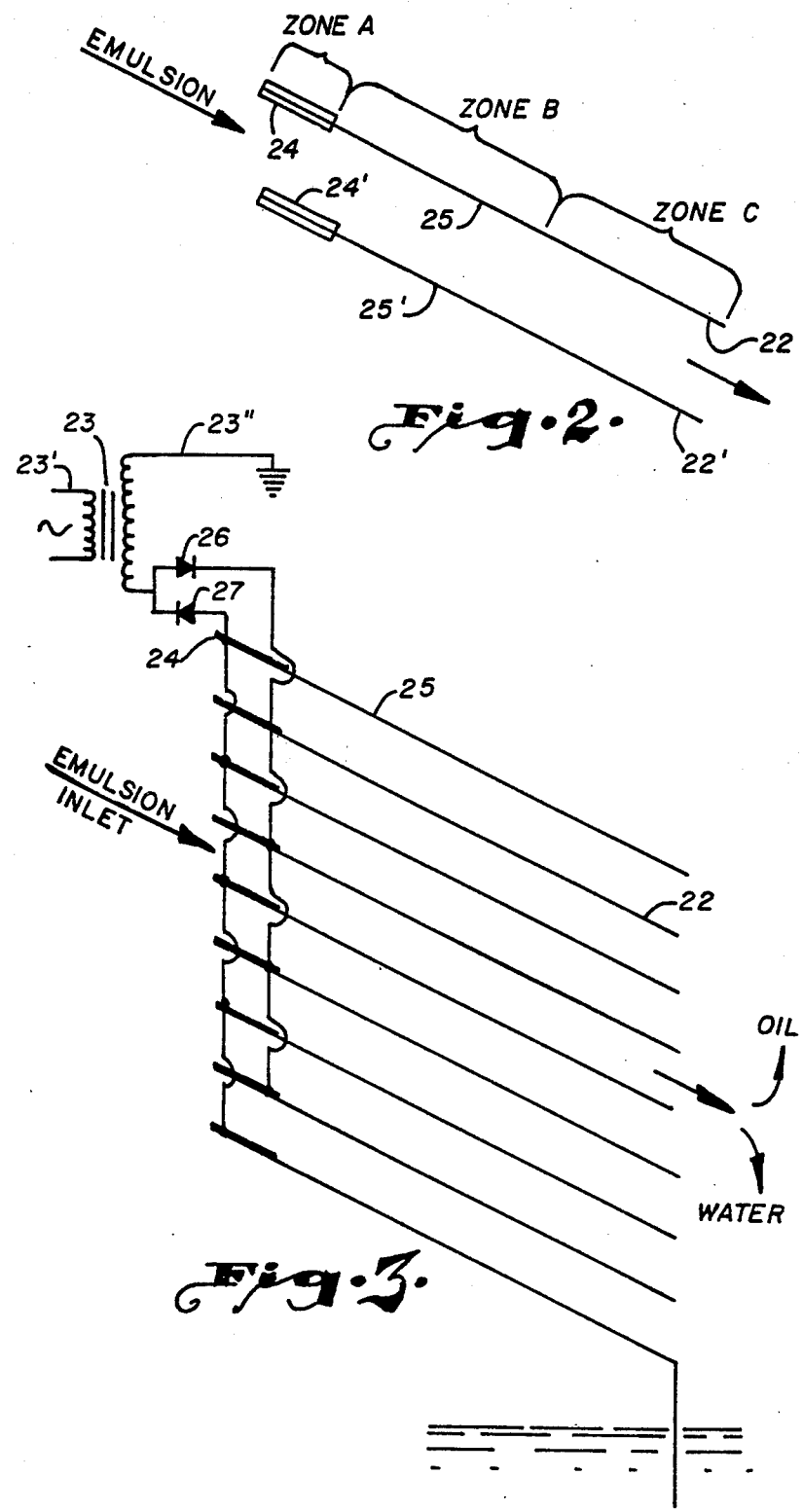
FIG. 2 is an elevation of representative plates of the inclined plate separator of FIG. 1 in which is designated the zones of strength for the electric field.
FIG. 3 is an elevation of the separator of FIG. 1 showing, in detail, the electrical system for energizing the plates of the separator.

In FIG. 2, the upper two plates 22, 22' of the array 21 in compartment 20 are shown in sectioned elevation. All the plates of the array are constructed in the same manner. Therefore, to disclose the function of the array as a unit, only two of the plates are disclosed with a scale large enough to clearly illustrate their function when formed of selected materials and connected to electrical source 23.

Each plate is made up of a composite of two sections. The first section 24 is formed of electrically conductive material. The trailing, or downstream, second section 25 is formed of nonconductive material. Arranged in intimate contact, sections 24 and 25 physically form a single sheet, body, or plate. The conductive section 24 is connected to source 23, as will be specifically disclosed in FIG. 3. The fluid mixture from disengagement zone 11 flows through the passageway provided plates 22, 22', the plates being uniformly spaced and parallel to each other.

The parallel plates 22, 22' of array 21 provide a homogeneous electric field of constant strength at the entrance of their passageway, followed by a degrading portion of the field. Note that the degrading of the field is accomplished not by increasing the distance between the plates, as electrodes, with a uniform charge density, but by degrading the potential between the plates in the direction of flow while maintaining the plates at a constant separation distance. In this way, droplet dispersal due to electrical stress is minimized in the low field strength areas of the degrading field.

The degrading field is achieved by virtue of the insulating properties on the nonconductive section 25 of each plate electrode. Contact with the conductive section 24 at the front of each plate establishes a surface charge on the insulating section 25 of the same polarity as that imposed upon the conducting material. However, since the insulating material is, by definition, nonconductive, this charge is not distributed equally over its entire surface area. A high density of surface charge is found in that region near the conductive section of the plate, while the density of surface charge decreases in the direction of flow with increasing distance from the conductive section.

The space between the pair of composite plates 22, 22' in the array 21 is, therefore, divided into three zones, A, B, and C. These zones are indicated in FIG. 2. Zone A is the region between the charged conductive section 24 of the plates. In zone A, the emulsion is exposed to a homogeneous electric field of constant field strength. The highest electric field strength to which an emulsion will be exposed while flowing through the array will be in this zone. Zones B and C are bounded by the insulating, nonconductive sections 25, 25' of plates 22, 22'. In zone B the electric field is degrading in the direction of flow, while in zone C the electrical field is weak, or non-existent. Therefore, in zones A and B, coalescence is electrically enhanced by the mechanisms already discussed, while zone C functions substantailly as an inclined plate separator with coalescence being mechanically enhanced.

The relative dimensions of the three zones described in FIG. 2, and the characteristics of the electric fields generated in the zones, are dependent upon a number of design factors. These include, (1) the distance to which the conductive section extends in the direction of flow; (2) the potential applied to the conductive section; (3) the characteristics of the applied potential; (4) the spacing between plates in the array; (5) the charging characteristics of insulating section 25; and (6) the distance to which the insulating section extends in the direction of flow. The proper choice of design parameters will be dependent upon the characteristics of the emulsion to be treated and treating requirements. If the electrically enhanced inclined plate separator is to be used as a primary coalescence device, for example, then it would be desirable that zones A and B make up a relatively large fraction of the area between adjacent plates and that a high strength electrical field be generated in zone A. The dimensions of zone A are, of course, controlled by the dimensions of the conducting section of each plate. The dimensions of zone B will be dependent upon the charging characteristics of insulating material. An insulator which readily accepts and retains a surface charge, like fiberglass, is best suited for a gradual decline of surface charge in the direction of flow. The electrical field strength at the entrance of zone B is dependent upon both the charging characteristics of the insulating material and the potential applied to the conducting section of zone A.

If the electrically enhanced inclined plate separator is to be used as a secondary coalescence device following, for example, a primary device which may, because of the emulsion characteristics, be better suited for coalescing the finer droplets of the dispersed phase, then a relatively large zone B with a relatively weak degrading electrical field may be desirable. Such characteristics can be created by employing a relatively small zone A which has been weakly charged and an insulating material, again like fiberglass, which readily accepts and retains a surface charge. Through adjustment of the potential applied to the conducting sections of zone A, it has been observed that a weak degrading field may be created in zone B which enhances coalescence through polarization of droplets of the dispersed phase without detrimental hindering of droplet gravitation by the electrophoretic effects.

An analysis of the characteristics of insulating material is suggested to stabilize this concept of establishing a degrading field with the composite plates made up of electrically conductive and electrically nonconductive, or insulating, sections. Fiberglass may be an acceptable insulating material for the second section of each of the composite plates. On the other hand, other insulating materials may be selected in view of the following factors.

The charging of an insulating material is predominantly a surface phenomenon and not well understood. However, the rate of transfer of charge along the surface of an insulator and the rate of loss of charge to the surrounding environment is related to the charge relaxation time constant of the material defined by the following equation: $\tau = \epsilon / \sigma$ where $\tau$ = charge relaxation time constant, $\epsilon$ = the permittivity and $\sigma$ = the conductivity of the material. A material with a large charge relaxation time constant may transmit a charge along its surface relatively slowly but is less easily discharged than a material with a smaller charge relaxation time constant. Therefore, materials with a large charge relaxation time constant are probably best suited for maintaining a relatively stable surface charge gradient. Refer to: Moore, A. D., Ed., *Electrostatics and Its Applications*, John Wiley & Sons, New York (1973).

The Electric Circuit of the Inclined Plate Separator

FIG. 3 is illustrative of an embodiment of the present invention in which the best features of an electrical coalescing system and an inclined surface separator are combined in one treating device for the purposes of coalescing droplets of a dispersed polar liquid in a nonpolar continuous liquid phase. Represented is a parallel array 21 of plates 22 in which the front section 24 of each plate is an electrical conductor, and the downstream section 25 is formed of an electrically nonconducting material. The electrically conductive material on the front of the plate is present along virtually its entire width. The electrical circuitry includes a transformer 23 with a primary 23' connected to a source not shown, and a secondary 23" connected on one side to ground and on the other side to section 24 of each plate 22. The connection of the secondary to the electrodes includes two rectifiers 26 and 27 in parallel. Each rectifier is connected to half of the plates 22 in the array 21 in such a way that every other plate is connected to the same rectifier. Connected in this way, every adjacent pair of plates of the array are oppositely charged.

Alternately, the rectifiers 26 and 27 may be eliminated from the circuit and one side of the secondary 23″ connected to every other plate in the array, while the other side of the secondary 23″ is grounded and connected to the remaining plates. Connected in this way, in every adjacent pair of plates in the array, one plate is charged with alternating current, while the other plate is grounded.

Of course, the electrically enhanced inclined plate separator represented by FIG. 3 must be housed in a vessel such as represented by compartment 20 in shell 1. The design of this vessel is not indicated in FIG. 3 since the design of the vessel will be dependent upon the application in which the invention is used. In operation, baffles, also not shown, direct the flow of the emulsion in an essentially horizontal fashion into the plate array. Droplets of dispersed phase, here represented by water, which coalesce in the electric fields, are collected in areas of low electric field strength by their gravitation to the surfaces of plates. Further coalescence takes place on these surfaces as droplets travel down the plates to the exit region of the plate array. Coalesced droplets of dispersed phase are discharged from the ends of each plate into a quiescent disengagement zone 11a and gravitate to the interface between the water and oil. Dry oil is removed from the top of the quiescent zone while water is removed from a body of water in the bottom of the treating vessel.

Conclusion

The present invention might be considered closely allied to the invention of U.S. patent application, K. L. Sublette, Ser. No. 345,963, filed Feb. 5, 1982. In that application, the inclined plate separator was separate from and located downstream of an electric field. The sequential effects of the field and separator effectively coalesced relatively polar liquids dispersed in the continuous phase of relatively non-polar liquids. The present application goes beyond this concept by establishing an electric field in the passageways of the inclined plates of the separator and degrading this field in the direction of flow.

The parallel plates of the separator array are referred to as "composite", being made up of a front section of electrically conductive material, and a trailing section of electrically nonconductive material. The resulting electric field established in the passageways of the inclined plates is analyzed in its dimensions and strength by designating dividing zones. The source of electrical energy connected to the conductive section of the composite plates is preferably arranged to charge adjacent plates with different polarity. However, no specific connection between the electrical source and plates is to be taken as limiting the scope of the invention.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A separator for employing an electric field and mechanical surface to the separation of a relatively polar dispersed liquid phase from a relatively non-polar continuous liquid phase, including;
   an array of plates fixed parallel to each other and inclined downwardly to form passageways to receive a mixture of polar and non-polar liquids, in which,
   (a) the first section of each plate is formed of electrically conductive material,
   (b) each plate contains a second section fixed to the first section as a continuation and formed of an electrically nonconductive material;
   means for flowing a mixture of polar and non-polar liquids down the passageways provided between the plates of the array;
   and an electrical source connected to the electrically conductive first section of each plate of the array to generate an electric field in each passageway formed between the plates of the array;
   whereby the liquid mixture is first exposed to the electric field between the electrically conductive first section of the plates and secondly to a degrading electric field in the direction of flow created by the degrading charge density on the second section of the plates and thirdly to the mechanical contact with the second section of the plates.

2. The separator of claim 1, in which,
   the electrical source is connected to the plates in the arrangement whereby adjacent plates are oppositely charged.

3. The separator of claim 1, in which,
   the second section of the plates is formed of fiberglass as the nonconductive material.

4. The separator of claim 1, in which,
   the electrical source is connected to the plates in the arrangement whereby alternating plates are charged by alternating current and the remaining plates are grounded.

5. A treating system for separating a polar dispersed liquid from a non-polar continuous liquid, including;
   a horizontally extended shell in which treatment of a mixture of polar and non-polar liquids takes place;
   means for introducing a mixture of relatively polar liquids dispersed in a relatively non-polar liquid into one end of the shell;
   a first compartment within the shell connected to receive the mixture flowed into the shell to provide residence time for a portion of the relatively polar liquid to coalesce and gravitate in separation from the relatively non-polar liquid;
   means for flowing the remaining mixture of liquids into a compartment in which a plate separator is mounted and which separator has,
   (a) a first parallel plate sections of electrically conductive material mounted in the array parallel to each other and inclined downwardly to the horizontal flow of liquid mixture into the compartment,
   (b) a source of electrical energy connected to the electrically conductive plate sections to generate an electric field between the plate sections,
   (c) second plate sections of electrically nonconductive material mechanically connected to the first plate section to form a continuous surface of each pair of conductive and nonconductive sections in order to generate an electric field between the second plate sections degrading in the direction of the mixture flowing between the plates, and means for providing collection of coalesced polar liquid from the plates and withdrawing the collection from the vessel.

6. The treating system of claim 5, in which, the electrical source is connected to the first plate sections in an arrangement whereby adjacent plate sections are oppositely charged.

7. The treating system of claim 5, in which, the second plate sections are formed of fiberglass as the nonconductive material.

8. The treating system of claim 5, in which, the electrical source is connected to the plates in the arrangement whereby alternating plates are charged by alternating current and the remaining plates are grounded.

9. A separator system for the polar and non-polar liquids of a mixture in which the polar liquid is dispersed in the non-polar liquid, including, a first set of plate sections formed of electrically conductive material, a second set of plate sections formed of electrically nonconductive material, means for forming an array of composite plates in which each plate is arranged parallel to each other and inclined downward to the horizontal and comprises one of the first set of sections as its front portion and one of the second set of sections as a continuation of the first section, a source of electrical energy connected to the conductive sections of the plates to establish an electric field in the passageways formed between the parallel plates with a degrading field between the second portions of the plates degraded in the direction of flow in the passageway, and means provided for collecting the coalesced polar liquid flowing from the array and separately collecting the non-polar liquid flowing from the array.

10. The separator system of claim 9, in which, the electrical source is connected to the first set of plate sections in an arrangement whereby adjacent composite plates are oppositely charged.

11. The separator system of claim 9, in which, the second set of plate sections are formed of fiberglass as the nonconductive material.

12. The separator system of claim 9, in which, the electrical source is connected to the plates in the arrangement whereby alternating plates are charged by alternating current and the remaining plates are grounded.

* * * * *